United States Patent [19]

Markle et al.

[11] Patent Number: 4,755,870
[45] Date of Patent: Jul. 5, 1988

[54] COLORING A BLACK AND WHITE SIGNAL USING MOTION DETECTION

[75] Inventors: Wilson Markle; Brian Hunt, both of Toronto, Canada

[73] Assignee: Colorization Inc., Toronto, Canada

[21] Appl. No.: 936,411

[22] Filed: Dec. 1, 1986

Related U.S. Application Data

[63] Continuation-in-part of Ser. No. 512,844, Jul. 11, 1983.

[51] Int. Cl.[4] .............................................. H04N 9/74
[52] U.S. Cl. ........................................ 358/81; 358/82; 358/36; 358/167
[58] Field of Search ...................... 358/81, 82, 22, 183, 358/36, 37, 166, 167; 352/38, 85

[56] References Cited

U.S. PATENT DOCUMENTS

| | | | |
|---|---|---|---|
| 3,551,589 | 12/1970 | Moskovitz | 178/5.4 |
| 3,647,942 | 3/1972 | Seigel | 178/5.4 |
| 3,706,841 | 12/1972 | Novak | 178/5.4 |
| 3,761,607 | 9/1973 | Hanseman | 178/5.4 |
| 3,772,465 | 11/1973 | Vlahos et al. | 178/5.4 |
| 3,784,736 | 1/1974 | Novak | 178/5.4 |
| 4,107,736 | 8/1978 | Holland et al. | 358/36 |
| 4,149,185 | 4/1979 | Weinger | 358/81 |
| 4,574,393 | 3/1986 | Blackwell et al. | 358/81 |
| 4,606,625 | 8/1986 | Geshwind | 358/81 |
| 4,608,596 | 8/1986 | Williams et al. | 358/81 |
| 4,613,906 | 9/1986 | Tanaka | 358/183 |
| 4,625,231 | 11/1986 | Vlahos | 358/22 |
| 4,642,676 | 2/1987 | Weinger | 358/22 |

OTHER PUBLICATIONS

"The Development and Application of Colorization" by Wilson Markle, SMPTE Journal, Jul., 1984, pp. 632–635.

"A Motion-Adaptive High-Definition Converter for NTSC Color TV Signals" by Masahiko Achiha et al, SMPTE Journal, May, 1984, pp. 470–476.

*Primary Examiner*—Michael A. Masinick
*Attorney, Agent, or Firm*—Rogers, Bereskin & Parr

[57] ABSTRACT

A method and apparatus for coloring a black and white film. The film is converted to video tape and the locations of edges of moving objects in frames of the video signal are used to develop a motion indicator key. The motion indicator key is used to reduce noise in the video signal without smearing motion and is used to assign colors to the black and white signal. For each scene of the black and white film, a color mask is produced for one frame. The adjacent frame is then colored the same as the initial frame except where motion is indicated. Where motion is indicated, a selected process assigns colors, for example based on direction of movement or grey levels of adjacent pixels. The new color mask thus produced is used as a reference for coloring the next frame. In this way the whole film may be colored, scene by scene. The color mask produced may then be combined with the black and white video signal to produce a colored video signal.

21 Claims, 8 Drawing Sheets

NOISE REDUCTION
MOTION PULSE SHAPER

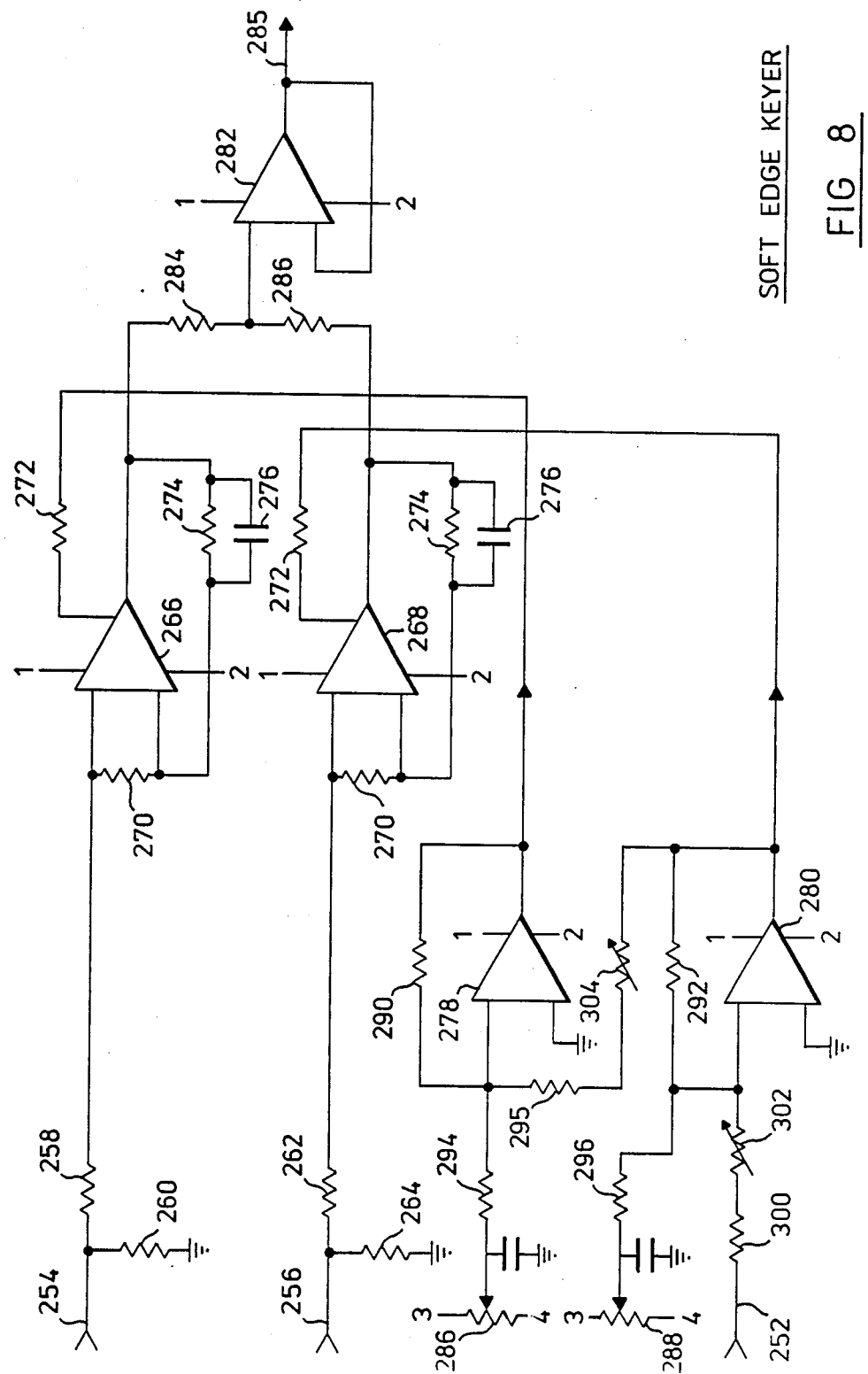

COLORING A BLACK AND WHITE SIGNAL USING MOTION DETECTION

RELATED APPLICATIONS

This application is a continuation-in-part of U.S. patent application Ser. No. 512,844 filed July 11, 1983, for Method of, and Apparatus for, Coloring a Black and White Video Signal.

FIELD OF THE INVENTION

This invention relates generally to a method and apparatus for coloring a black and white film using motion detection.

BACKGROUND OF THE INVENTION

Television viewer preference for colored motion picture over black and white motion pictures has made it desirable to color the vast stock of black and white motion pictures.

Coloring a black and white motion picture, where the motion picture is in video tape format, requires adding a color subcarrier to the black and white video signal. This coloring process is difficult due to the large number of frames that constitute a black and white motion picture. In a video tape signal derived from a black and white motion picture each frame constitutes a series of scan lines, and each scan line constitutes a series of dots or pixels. To color a black and white motion picture video signal requires assigning a value for the color subcarrier to each dot or pixel of the black and white motion picture video signal. Because of the large number of pixels in a frame and consequently in the motion picture, this process can be very time consuming.

However, the applicants have realized that motion in a black and white motion picture video tape signal corresponds to a change in the value of the luminance for a particular part of a frame from one frame to the next. The applicants have found that only a small percentage of each frame changes in this manner. The changes from one frame to the next are due to moving edges or noise. Motion is picked up only at moving edges because dots or pixels corresponding to the interior of a moving object remain at approximately the same luminance from one frame to another.

Since only a small percentage of each frame changes from one frame to another, once one frame has had colors assigned to each dot or pixel of the frame, corresponding dots or pixels in the next frame can be assigned the same color, and changes of color are only required to be made to areas corresponding to areas of motion. This significantly reduces the number of operations required to color a black and white motion picture.

It is therefore desirable to isolate parts of a video tape signal corresponding to areas of motion, without picking up noise, and to assign new colors only to those parts of the video signal corresponding to areas of motion, the other parts of the color signal remaining the same from frame to frame. By this method a color mask may be produced which when combined with the black and white video signal yields a color video signal. The original black and white film frequently contains a noise component which may detract from the pleasure of viewing the film. This noise may be reduced by averaging successive frames of the video signal since noise is random from frame to frame, (thus appearing in different places in successive frames).

Motion also appears as a frame to frame difference but it is progressive from one frame to the next. Averaging successive frames, therefore, tends to smear the motion.

It has therefore been found desirable to avoid noise reduction in parts of a frame where motion is present. This means that the areas of motion retain a noise component, but since the areas of motion are typically small as compared with stationary areas, this noise does not distract the viewer.

SUMMARY OF THE INVENTION

In its broadest aspect, this invention provides a method of producing a color mask for a black and white video signal comprising consecutive frames and having a motion indicator key, the method comprising: (a) determining pixels of the video signal for each frame corresponding to motion in the frame to produce a motion indicator key for each frame; (b) assigning color signals to one frame of the black and white video signal to produce a color mask; (c) selecting a color assigning algorithm; (d) selecting a frame (the working frame) adjacent to a frame (the reference frame) having a color mask; (e) assigning the color signals of the color mask of the reference frame to corresponding pixels of the working frame to produce a color mask for the working frame; (f) applying the color assigning algorithm to remove color signals from pixels of the working frame corresponding to motion and assigning the color signals of the moving body to those pixels; (g) repeating steps (c) to (f) to produce a color mask for each frame of the black and white video signal; and combining the color mask with the black and white video signal to produce a color video signal.

In another embodiment, the method for determining portions of the video signal corresponding to areas of motion outlined in step (a) above comprises: selecting a motion threshold; inverting one of two nearby frames and adding it to the other to produce a composite signal; comparing the magnitude of the composite signal to the motion threshold to produce a motion signal indicating areas of the composite signal for which the magnitude is greater than the motion threshold; and repeating these steps for each frame of the video signal.

In a further embodiment, said method further comprises reducing noise in the video signal by: selecting a working frame of the video signal; averaging at least two frames that are nearby to the working frame to produce an averaged frame; constructing a composite frame by selecting luminance values from the working frame where the motion indicator key indicates motion and selecting luminance values from the averaged frame where the motion indicator key does not indicate motion; and repeating these steps for each frame of the video signal.

Further embodiments of the invention will be found in the claims forming part of this patent.

BRIEF DESCRIPTION OF THE DRAWINGS

Reference will now be made to the accompanying drawings which illustrate a preferred embodiment of the invention by way of example, and in which:

FIG. 8 is a schematic of a soft edged keyer used to reduce noise in the video signal.

DESCRIPTION OF THE PREFERRED EMBODIMENTS GENERAL

Figure 1:
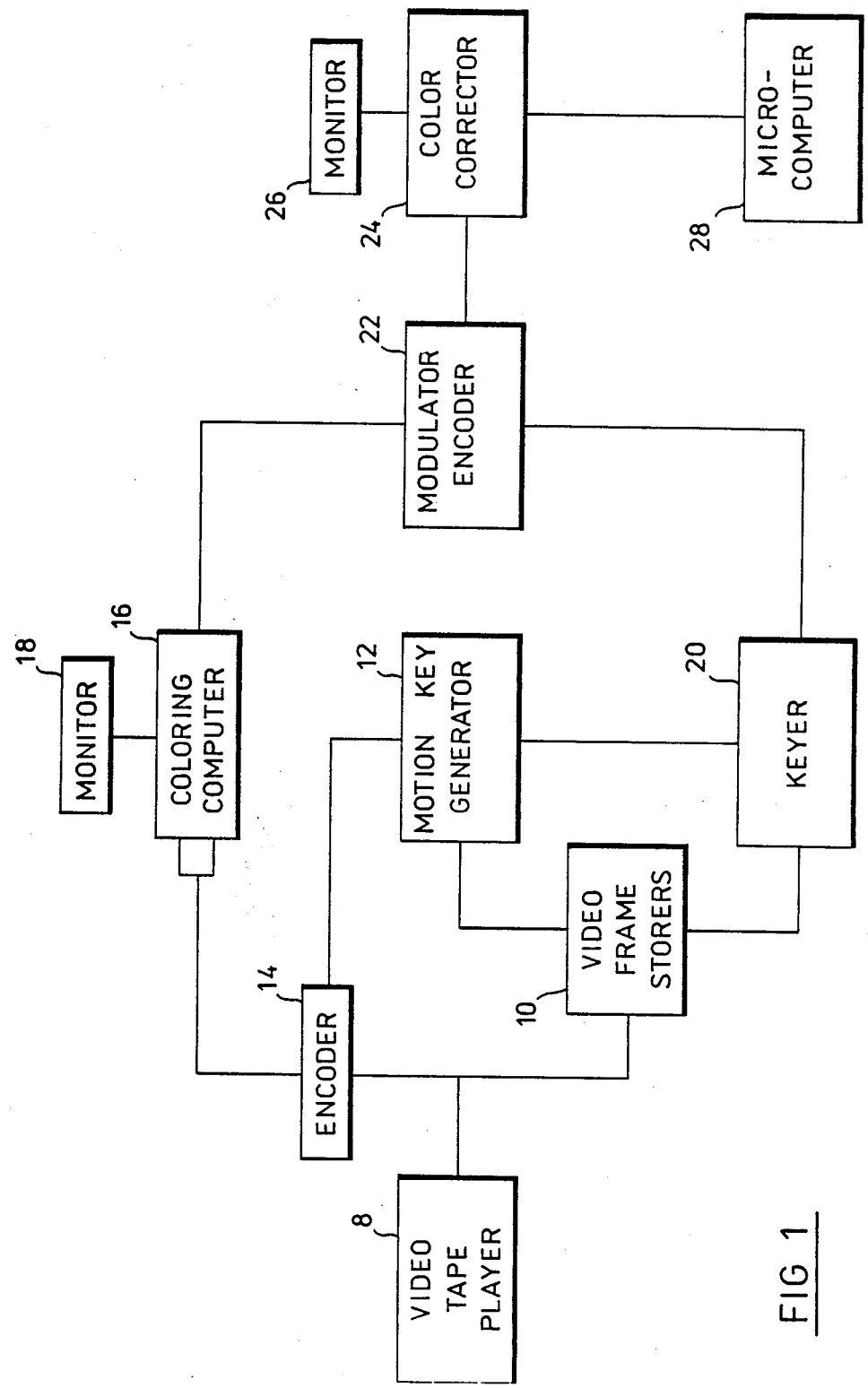
FIG. 1 is a schematic of the overall process for coloring a black and white film.

Referring to FIG. 1, the coloring of a black and white video signal as described by way of example here generally involves the following processes.

1. A video signal is created from a black and white video film using a standard broadcast scanner (not shown). The original striped SMPTE audio time code is read and a VITC (vertical interval time code) is placed on the video tape twenty lines before the picture content at the beginning of each frame. This VITC allows control of the video tape when it is stationary.

2. The black and white video signal is then played back by video tape player 8 and fed through a group of stand-alone video frame storers 10 to a generator 12 which generates a motion indicator key which has a uniform signal where motion is present in a frame.

3. The motion indicator key is encoded onto the black and white video signal as a color subcarrier using a modified standard encoder 14. We use the green subcarrier for convenience.

4. The black and white video signal is input through a standard translator (not shown) to a coloring computer 16 where the motion indicator key is separated from the black and white video signal. Both key and signal are placed on disk. The coloring computer 16 is used to produce a color mask for the video signal using the motion indicator key. The computer has a monitor 18 for viewing the color mask created by the computer. The computer controls the location of the video signal by the VITC code using a standard VITC counter.

5. The black and white video signal produced at 10 may also be input to a soft edge keyer 20 through the group of stand-alone video frame storers 10. The keyer 20 uses the motion indicator key produced at 12 to mix a signal composed of averaged adjacent frames and a frame which is not averaged to produce a signal that is noise reduced only in areas where movement is not indicated by the motion indicator key. Noise reduction may be omitted if the original signal is sufficiently free of noise.

6. Both color mask and noise reduced video signal are input in separate channels to a modulator/encoder 22. The modulator portion of the modulator/encoder 22 is used to modulate or color contour the color mask using the grey level of the black and white video signal in a known fashion. The modulator contours the colors by reducing chroma at high black and high white levels. The encoder portion of the modulator/encoder 22, for example an NTSC encoder, is used to encode the color mask as red, green and blue color subcarrier on the black and white video signal.

7. The color video signal produced at 22 is input to a color corrector 24 for example a Cox Color Corrector, where the color video signal may be viewed on a monitor 26.

8. If desired the color corrector 24 may be used to modify the eight luminance values of the black and white video signal to produce a visually enhanced picture. Normally this is required to be done only once per scene of a black and white video film. The color corrector 24 may be controlled by a microcomputer 28 with digital to analog converter (not shown). This microcomputer 28 may be programmed to control the color corrector 24 and store on disk the color corrections required for each scene. When recording takes place, these stored corrections may be recalled for editing the final product.

Figure 2:
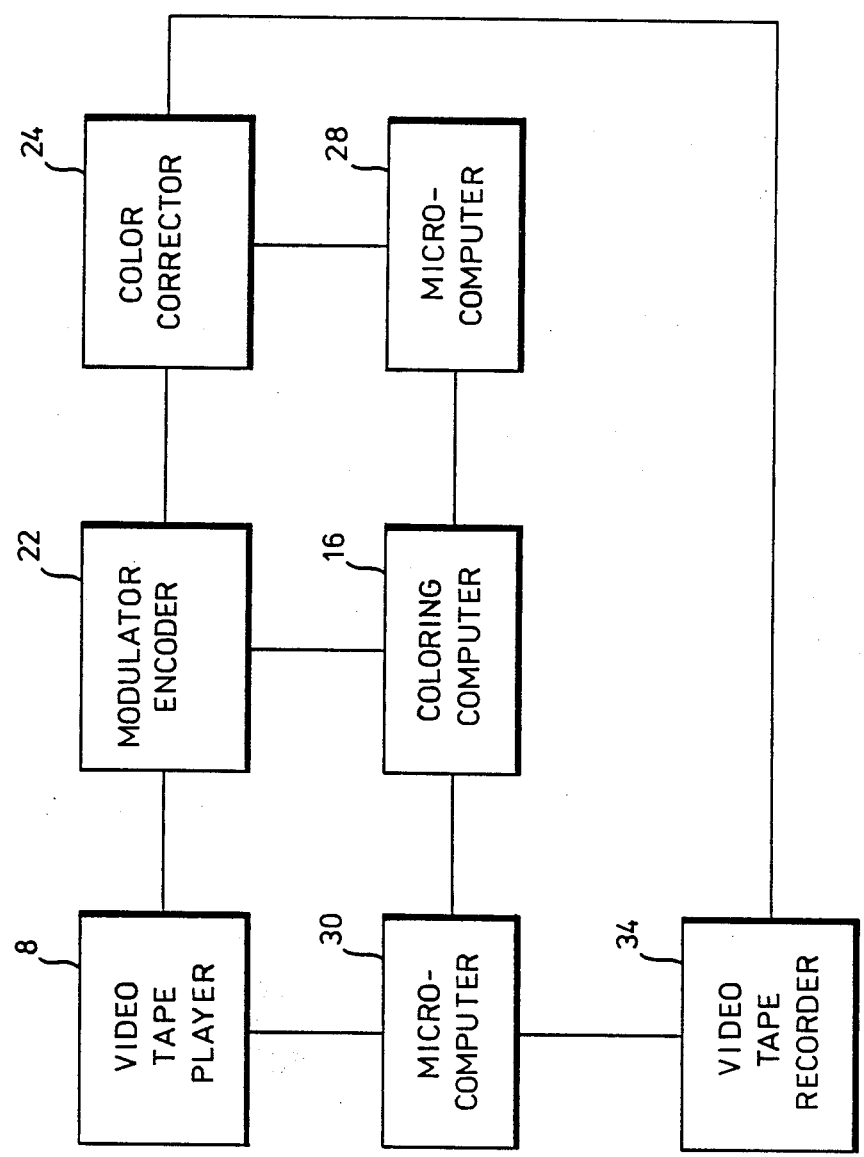
FIG. 2 is a schematic of a process for recording the color video signal.

9. At this stage, although the final product may be viewed, there exists no tape containing the combined color and black and white signals. This is produced during an editing process shown generally in FIG. 2. A microcomputer 30 controls coloring computer 16, black and white video player 8, and video recorder 34 and the microcomputer 28 to record the color video at 34. A master tape having the same VITC time code as the original black and white video tape is used. The black and white video signal (which may or may not be noise reduced) from player 8 and color signal from the coloring computer 16 are used as slaves. An operator of the microcomputer 30 selects the location of the master and slaves. The coloring computer 16 plays back the color tape and the black and white video player 8 plays back the noise reduced video signal under control of the microcomputer 30. The output from the coloring computer 16 is again input to the color corrector 22 along with the noise reduced black and white video signal through the modulator/encoder 22 where the stored luminance corrections are used to modify the black and white video signal. The microcomputer 30 also control the output of the microcomputer 28. The output from the color corrector 24 is input to a video tape recorder 34 for recording. The coloring computer, video tape player 8 (for playback), and the recorder are each controlled by the editing microcomputer 30 using the VITC time code on each tape. In this manner a color video tape may be produced at 34.

The process described above will now be elaborated upon. Firstly, the generation of the motion indicator key will be described. This key is used both in creating the color mask for the black and white video film and for creating a noise reduced video signal.

MOTION INDICATOR KEY

The motion indicator key is a signal indicating areas of motion in a video signal. The motion indicator key contains information corresponding to each dot or pixel of each line of each frame of a video tape signal. Conveniently, the motion indicator key may consist of a unit signal where there is motion and zero signal where there is no motion. Also if this motion indicator key is embedded as a color subcarrier on a black nd white video tape signal then, when the black and white video tape signal and motion mask are viewed together on a screen, the areas of motion stand out as areas of color.

Figure 3:
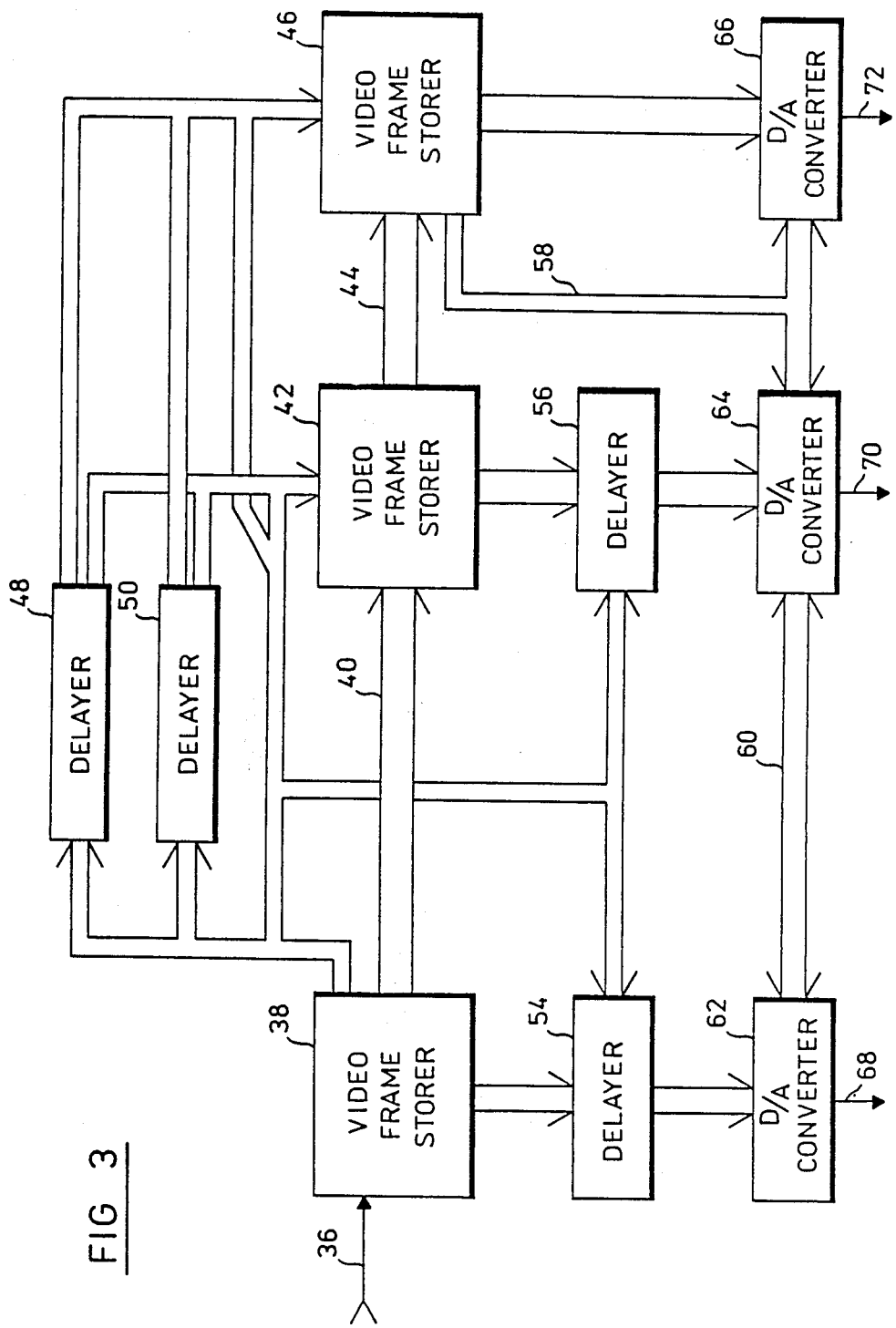
FIG. 3 is a schematic of an apparatus used to produce the input to the motion indicator key generator.

In the preferred embodiment of the invention described here a motion indicator key is produced consisting of unit values indicative of motion and zero values indicative of non-motion in a video signal. In FIG. 3, a black and white video signal 36 is input to stand alone video tape storer 38 where a first frame, labelled A, for convenience of reference, is stored in the video tape storer 38. The video tape signal input at 36 is then fed by data bus 40 to stand alone video frame storer 42 where the frame delayed by one frame from frame A is stored. This frame is referred to for convenience of reference as frame B. The video tape signal is then fed by data bus 44 to video frame storer 46. In video frame storer 46 the frame delayed by one frame from frame B is stored. The frame stored in video frame storer 46, for convenience of reference, will be labelled frame C.

Referring to FIG. 3, since the process of storing the delayed frames takes time, it is desirable to use the synchronizing and blanking pulses (sync and blanking) for each frame to synchronize the three frames A, B and C so that when they are later processed, parts of the frames having corresponding physical locations in the frame are processed at the same time.

Synchronization of the outputs from video frame storers 38, 42 and 46 is accomplished by horizontal variable delayer 48 connected to each of the video tape storers 38, 42 and 46, vertical variable delayer 50 similarly connected, variable delayer 54 connected between video storer 38 and digital to analog converter 62 and variable delayer 56 connected between video tape storer 42 and digital to analog converter 64.

Video frame storers 38, 42 and 46 each accept analog input and digitize the frame stored. Single arrows in FIG. 3 correspond to analog signal, and double arrows in FIG. 3 correspond to digital signal. Sync and blanking inputs at 58 and 60 to digital to analog converters 62, 64 and 66 provide for the synchronization of the output from the digital to analog converters 62, 64 and 66.

Digital-analog converters 62, 64 and 66 convert the digital signal from the respective video frame storers 38, 42 and 46 to analog outputs shown at 68, 70 and 72 corresponding to frames A, B and C respectively. The reason for isolating three frames is given later. However, the invention will work if frames that are close together ("nearby") are isolated. The method and apparatus for combining the two frames will now be described assuming that the frames to be combined are frames C and A.

The electrical signals will be discussed in terms of frames although it will be understood that the frame is set of electrical signals comprising a number of scan lines each comprising a number of pixels.

Figure 4:
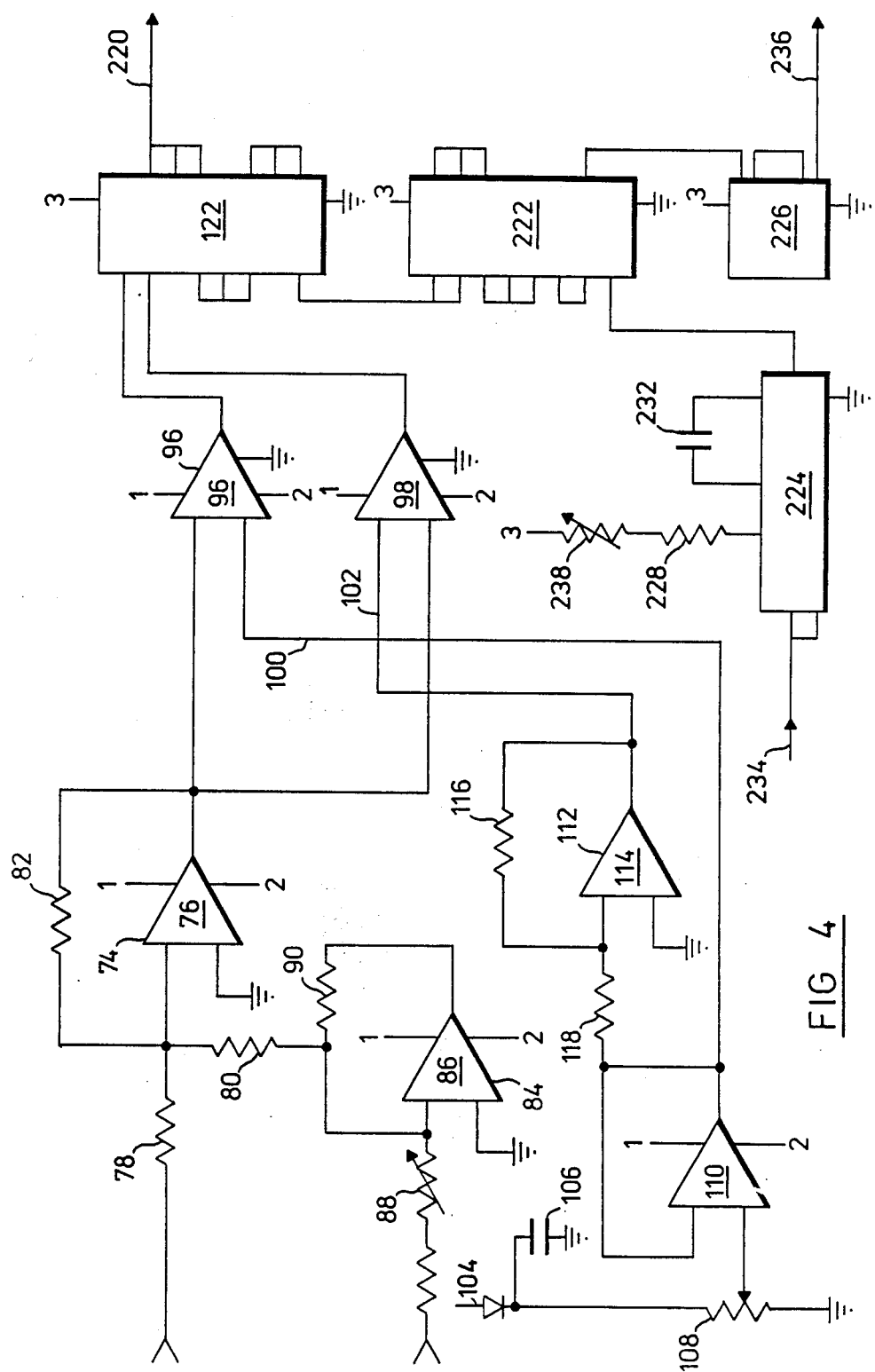
FIG. 4 is a schematic of a generator used to produce the motion indicator key.

Referring to FIG. 4, frame A, the output from video frame storer 38, is input to adder 74. Adder 74 may conveniently be a simple junction with integrated circuit 76 configured as an inverting summing amplifier with gain of 4.5 and resistors 78, 80 and 82. Voltages across the integrated circuits in the FIG. 4 are +12 at pins 1, −12 at pins 2, +5 at pins 3.

At the same time frame A is input to adder 74, frame C is input to adder 74 having been inverted by inverter 84. Inverter 84 may conveniently be constructed from integrated circuit 86 configured as an operational amplifier with variable gain between 0.6 and 2.0 and resitors 88 and 90. The gain of inverter 84 is varied so that the resultant sum at adder 74 is zero when frame A equals frame C.

Integrated circuits 76 and 86 may be, for example, model number LM318N available from National Semiconductor Corp.

The output from adder 74 is a composite signal equal to the negative of the difference between the luminance values from frame A and the luminance values from frame C, that is, C−A. The output C−A from the adder 74 is fed as input to the two comparators 96 and 98 which may conveniently be composed of integrated circuits such as model numbers LM306H configured as differential amplifiers and available from National Semiconductor Corp. The output C−A will then be a signal having signal strength whose magnitude, defined here as the absolute value of C−A of |C−A|, varies with the difference between the luminance values of the two frames, here C and A. Thus, for example, a moving edge between a moving object and a stationary background having high luminance contrast will result in a large magnitude for the C−A signal. The number of pixels traversed by the moving edge between frames will depend on the speed of the moving object relative to the background.

The magnitude of the C−A or composite signal is then compared with the motion threshold, selected in the manner described below. The motion threshold is assumed to be positive unless stated otherwise. A positive threshold is generated for input to comparator 96 at 100 and a negative threshold is generated for input to comparator 98 at 102. The threshold voltage may be provided by power source 104, grounded through capacitor 106, and made variable by variable resistance 108 which may be adjusted by the operator. The threshold voltage may be input through amplifier 100 to comparator 96 to provide a positive threshold, and input through amplifier 110 together with inverter 112 composed of operational amplifier 114 and resistors 116 and 118 to comparator 98 to provide a negative threshold. Amplifiers 110 and 112 may be, for example, half each of integrated circuit model No. LM5532N available from National Semiconductor Corp.

Comparator 96 in FIG. 4 outputs a unit signal where C−A is greater than the positive threshold. Comparator 98 outputs a unit signal where C−A is less than the negative threshold. Thus when the combined outputs from comparators 96 and 98 are added by adder 122 the output from adder 122 is a unit signal wherever |C−A| is greater than the absolute value of the magnitude threshold. Adder 122 may conveniently be an integrated circuit configured as an OR gate, shown in FIG. 4. Such an integrated circuit may be Model No. MM74HC32 available from Motorola Semiconductor Products.

The system described here is analog in the sense that the input signal is an unmodified video signal and the signal is processed continuously through the comparators 96 and 98 and adder 122, and when used in a film coloring process has been found to be more manageable than if carried out digitally in a computer when it is digital in the sense that the values of corresponding pixels of the nearby frame A and the inverted frame C are added to each other in the adder 74, and compared to the threshold in comparators 96 and 98.

The threshold is determined as follows. Noise in a motion picture frame is typically random from frame to frame and tends not to appear in identical places in successive frames. Thus when the difference in luminance values between nearby frames is taken, noise remains in the resulting |C−A| signal.

However, differences in luminance values may also be due to motion and the resulting |C−A| signal will contain both motion and noise information. The applicants have found that noise typically results in a lower |C−A| value than motion. A moving edge is often the boundary between sharp contrasts whereas noise is typically a middle grey value on a background whose average luminance is in the grey region. Hence the difference between noise and background tends to be less than the difference between two sides of a moving edge.

A carefully selected threshold achieved by varying the variable resistor 108 may then distinguish between noise and motion. The comparators 96 and 98 output only those values of C−A greater than the positive threshold or less than the negative threshold. The threshold may be called the noise threshold or motion threshold.

The output from adder 122, therefore, is a signal that indicates areas of sharp contrast between nearby frames. In this embodiment, therefore, nearby means one intervening frame. This resulting signal is called the motion mask. To compile a motion mask for the entire video signal, the entire video signal is run through the system described here in sequence, and each frame, except the first and last, becomes the frame B in turn.

The resulting motion signal or motion mask for a frame may then be embedded on frame C as a color subcarrier, for example, green. If the black and white video signal with green motion mask is then viewed, moving edges appear as green flashes. This may aid an operator, involved in assigning colors to a black and white video film frame by frame, to determine areas of each frame corresponding to motion. In addition, viewing the motion mask enables the motion threshold to be varied so that noise is eliminated from the motion mask without eliminating motion.

Thus if the motion threshold is too low, noise will appear as green. If the motion threshold is too high, areas of motion where the background luminance is close to the luminance of the moving edge will be missed. An operator may simply adjust the motion threshold by varying the variable resistance 108. Although all motion is difficult to pick up in the presence of noise, any loss of motion may be minimized by appropriate setting of the motion threshold. Motion that is lost will not generally affect a final product seriously if the noise level is not too high and if the threshold is appropriately selected.

CREATING THE COLOR MASK FOR THE VIDEO SIGNAL

Creating the color mask for the video signal is carried out in a coloring computer 16 such as the Dubner CBG-2 graphics computer available from Dubner Computer Systems Inc. of New Jersey. The Dubner graphics computer is typically used to produce animated motion pictures. The Dubner graphics computer may be used in combination with the motion indicator key for a black and white video signal to produce a color mask (or matte) for the video signal without requiring the laborious task of hand painting (using the grahics computer) each of the frames of the video signal.

ENCODING THE MOTION INDICATOR KEY

In the prefered embodiment described here, the motion indicator key on output from the C−A generator is not in condition for input into the graphics computer. For input to the graphics computer, the motion indicator key is first encoded onto the black and white video signal which is to be colored as a color subcarrier on the video signal, and then is separated from the video signal on input to the graphics computer so that the graphics computer has a signal which tells it where motion has occurred on each frame of the video signal.

Figure 5:
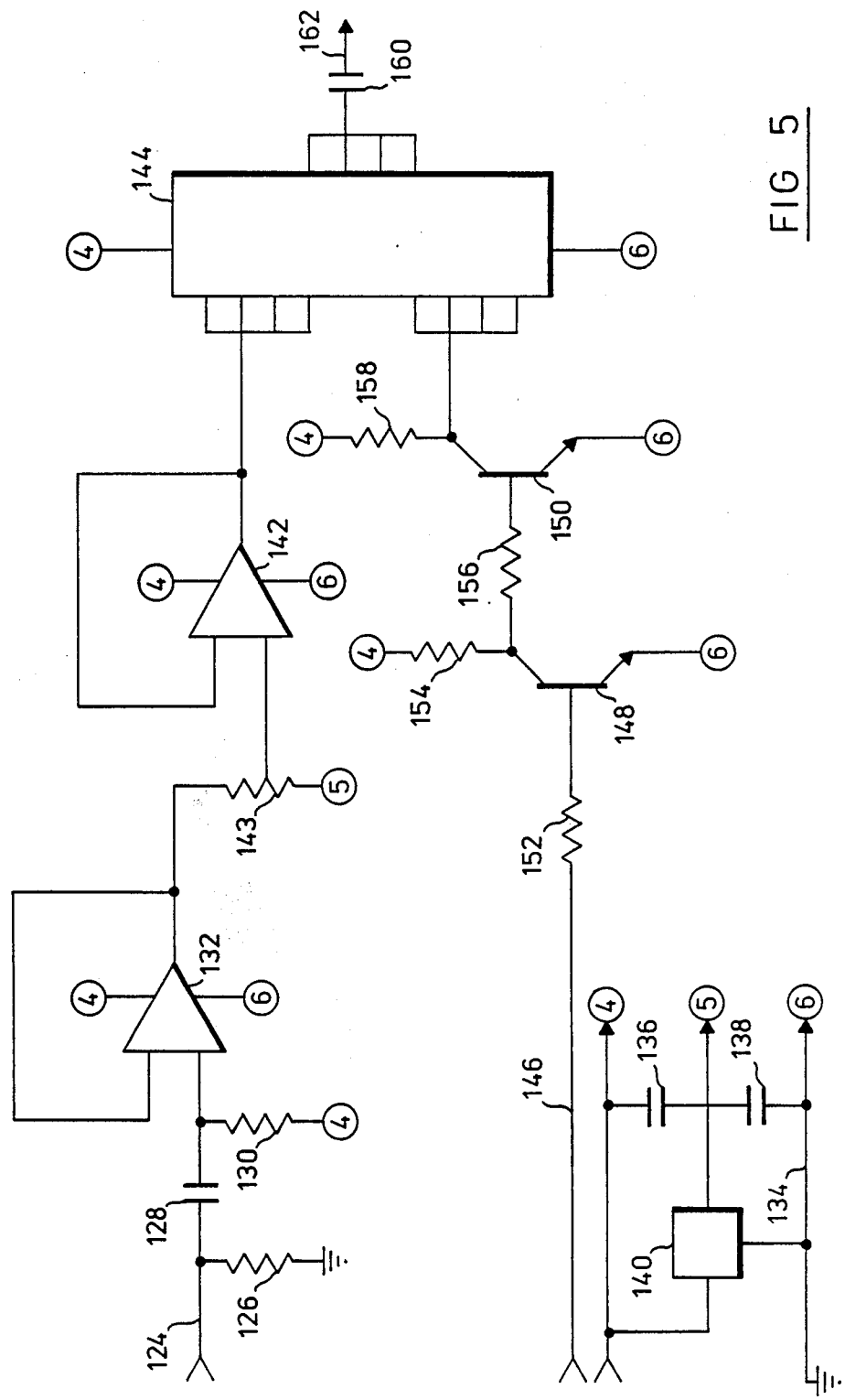
FIG. 5 is a schematic of an apparatus used to encode the motion indicator key on the video signal.

To encode the video signal with the motion indicator key, we have modified an encoder 14 for encoding a color subcarrier on a black and white video signal of a type commercially available as follows. Referring to FIG. 5 the color subcarrier is input to the encoder at 124 with grounded resistor 126, capacitor 128 and resistor 130 connected as shown and is buffered and DC double shifted by integrated circuit 132, for example Model No. LM318N available from National Semiconductor Corp. The voltages at pins 4, 5 and 6 in FIG. 5 are provided by the voltage regulator circuit shown generally at 134 with capacitors 136 and 138 and regulator 140. With a DC input of +9 V this regulator circuit 134 provides −5 V at 4, 0 V at 5 and +4 V at 6 which are input to the integrated circuits as shown.

The color subcarrier feed is then level adjusted by integrated circuit 142, also for example Model No. LM318N, together with variable resistor 143. The output of integrated circuit 142 is then fed to the input of integrated circuit 144 which is configured as a set of bi-lateral analog switches and may be Model No. MM54 HC4066 available from Motorola Semiconductor Products. The motion indicator key output by the |C−A| generator is input at 146 to two transistors 148 and 150 with resistors 152, 154, 156 and 158 to integrated circuit 144. The switches of integrated circuit 144 are controlled by the pulses of the C−A generator.

When the motion indicator key indicates motion, integrated circuit 144 closes allowing the color subcarrier to pass out through capacitor 160 and be injected onto the video signal coming out of the encoder 14 shown generally at 162. When no motion is indicated, integrated circuit 144 acts as an open circuit and does not affect the output video.

Figure 6:
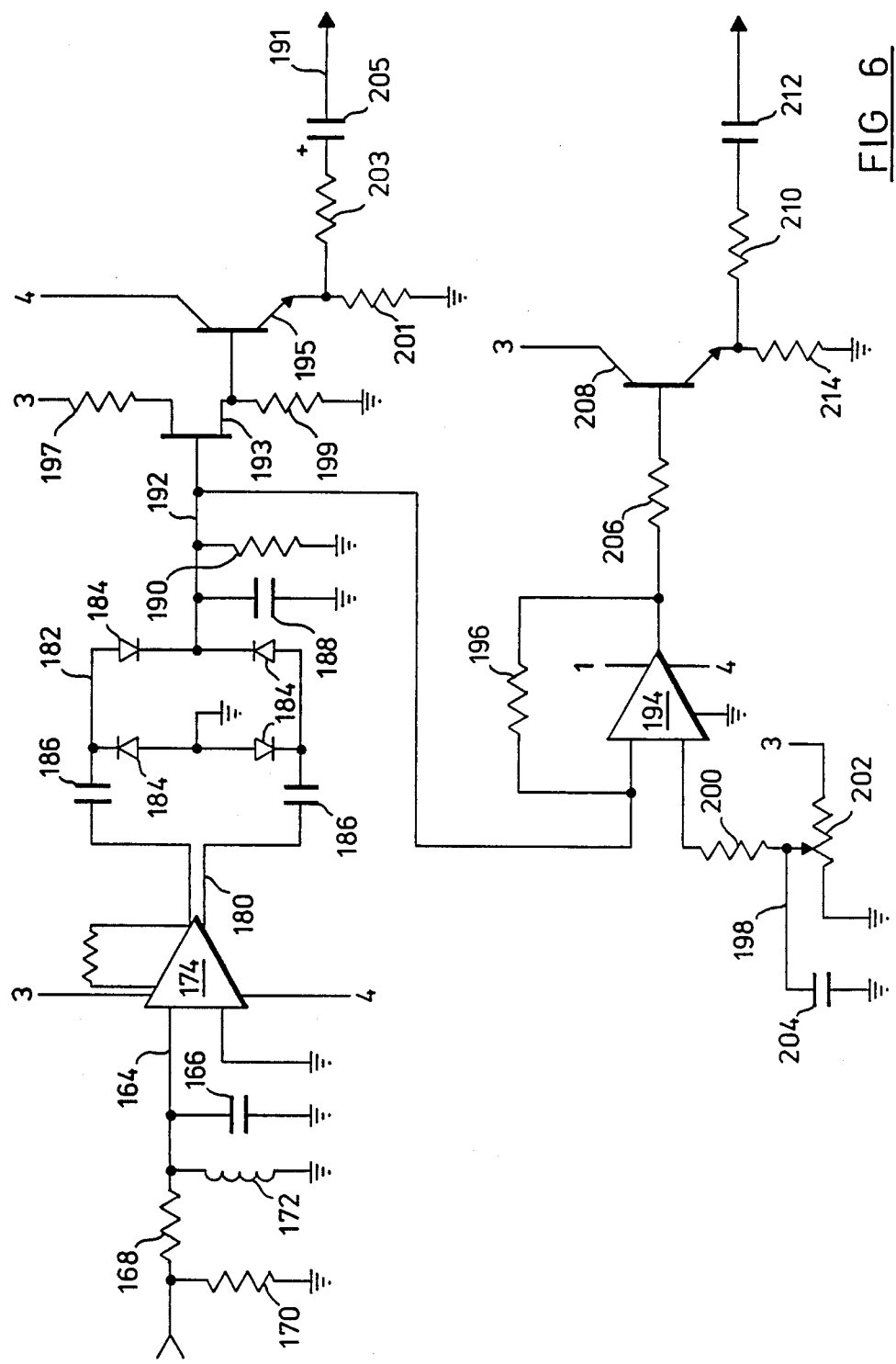
FIG. 6 is a schematic of the apparatus used to separate the motion indicator key for input to a coloring computer.

For input to the coloring computer 16, the motion indicator key, now a color subcarrier on the video signal, is separated from the video signal as follows. Referring to FIG. 6, the encoded video signal is fed through a bandpass filter 164 comprised of capacitor 166 and resistors 168 and 170 and inductor 172 to integrated circuit 174 (which may be, for example, Model No. LM733CH available from National Semiconductor Corp.) which is used to buffer and create two feeds of the color subcarrier at 180 degrees out of phase to each other, shown at 180. These feeds are then rectified and filtered using a diode and capacitor filter 182 composed of diodes 184 each Model No. IN914, and capacitor 186 on the output of integrated circuit 174, together with capacitor 188 and resistor 190. The output of this circuit shown at 192 is doubled subcarrier wherever the motion indicator key has indicated motion. The double subcarrier is fed into a highspeed comparator 194, for example integrated circuit Model No. LM710CH available from National Semiconductor Corp., whose level is set to detect the doubled subcarrier. Resistor 196 is in the comparator feedback loop, and the reference is produced by circuit 198 composed of resistors 200, potentiometer 202 and capacitor 204. The output of this high speed comparator 194 is then a constant level signal wherever motion is indicated by the motion indicator key. The constant level signal is then sent into the coloring computer 16 through resistor 206, transistor 208 and resistors 210 and 214 and capacitor 212 so that the graphics coloring computer 16 has a signal only where motion is indicated on the video signal. The doubled subcarrier is also output at 191 through FET transistor 193 and transistor 195 with resistors 197, 199 and 201 and through capacitor 205 and resistor 203 to drive an oscilloscope for adjusting the threshold of the motion detector as governed by the potentiometer 202.

THE COLORING COMPUTER

As stated before, the coloring computer is capable of producing a color mask for each frame of a video signal. When the color mask is overlain on a black and white video signal, the video signal appears colored. The coloring computer produces a color mask by assigning a color to each pixel of each frame of the video signal. The color can be assigned manually, using a mouse, or may be assigned by the color computer using any one of various processes.

Typically, a black and white film is composed of a series of separate scenes. It has been found that the colors for any one scene do not change very much through the scene. Accordingly, in some cases, to color a black and white video signal it is only necessary to color the first frame manually, and then use the coloring computer 16 with the motion indicator key to color the rest of the scene. This is done by an operator assigning colors to pixels in one frame of the video signal using the coloring computer 16 (e.g.with the mouse). This drawing is done on the color corrector monitor 26 over the black and white signal. The color appears as color only on the coloring computer monitor 18. This colored frame is then stored in the memory of the coloring computer 16. To commence operation the coloring computer 16 requires the following elements to begin the automatic coloring of a scene from a black and white video signal: color mask for the first frame of the scene (since the process could work equally well backwards this could also be the last frame, or any frame in between may be selected) created as decribed above; motion indicator key for the video signal; and the black and white video signal. Coloring of frames is carried out automatically in the coloring computer 16, using a program created for that purpose. The operation of the program is described here and a copy of the program together with a flow diagram is attached hereto as part of this description.

In the automatic coloring of a scene, the coloring computer 16 is set to track a certain number of frames at a time so that the operator may touch-up any erroneous assignments of color as required. Thus to begin operation, the operator selects and enters a frame spacing to the computer which sets the number of frames to be tracked automatically. The spacing chosen varies from film to film and scene to scene, but is typically two or four. To begin operation, the coloring computer 16 also requires the time code (VITC) of the initial frame to be colored and a color message which identifies the initial color mask which are selected by the operator. On receiving this information from the operator, the coloring computer then loads the selected color mask into its graphics card. The coloring computer 16, also using the time code, loads the frame of the black and white video signal which is to be colored (the working frame) into its memory.

If the frame spacing is two and if the working frame is frame C then the color mask will be the color mask for frame A, also designated here as the reference frame. The motion indicator key of frame C will then have been derived by looking at frames C and A (see the discussion on the |C−A| generator). At the same time as the mask is loaded the motion indicator key, embedded as described above as a color subcarrier on the black and white video signal of the working frame, is separated from the black and white video signal, digitized and stored in the memory of the coloring computer 16. Any frame between the working frame and reference frame is assigned the same color mask as the reference frame. Since there is not usually a great deal of movement between frames, we have found this not to affect the final product significantly.

The operator then selects a process for coloring the working frame. This may be any one of several processes as described below each using the motion indicator key for same color mask. Thus each pixel of the working frame has the same color signal as the corresponding pixels of the reference frame.

The coloring process then removes the color signal from the working frame at pixel locations corresponding to movement between the reference frame and working frame as described below. This step occurs in all processes for coloring a frame.

In one frame coloring process, the coloring computer 16 compares the motion indicator key for the reference frame to the motion indicator key for the working frame to determine the direction of movement. Pixels of the working frame indicated as corresponding to movement as indicated by the motion indicator key for that frame are assigned the appropriate colors indicated by the direction of movement.

This is equivalent to moving the color signals in the working frame in the direction of movement to replace the color signals which have been removed. To do this, the process assumes the leading edge of motion in the reference frame is equivalent to the trailing edge of motion in the working frame. Thus if frame A is the working frame, and frame C the reference frame, then the leading edge of motion in frame C is assumed to be the same as the trailing edge of motion in frame A. Only colors appearing between the leading edge and trailing edge in frame A, the working frame, are altered.

That is, color signals are assigned to pixels corresponding to movement in the working frame according to the color signals of pixels located in the color mask of the working frame on the side of the leading edge of the movement from which the movement seems to be proceeding. Thus where background is being revealed by a moving body, color signals of background are assigned and where background is being obscured, color signals of the moving body are assigned. The movement of color signals therefore only occurs in areas of the working frame for which the motion indicator key indicates movement.

Once tracking of the color has been accomplished automatically in the manner described, the operator may decide whether all the movement has been colored and if any wrong colors have been moved. The operator may then fix up the frame manually using a standard painting system in the coloring program. This program is a standard mouse interfaced painting system with the ability to do the following: paint, change brush sizes, select palette positions, shift left/right and fill an enclosed area.

When the painting of the working frame is complete, the coloring computer 16 then saves the finished color frame on a disk with appropriate identification. The color mask for the working frame is also saved in a memory buffer for reference in tracking the next frame. The computer then updates the time code of the frame required, and the message name and number (of the color mask for later identification) by incrementing the counters by the number of frames tracked. The program then loops back and the cycle continues until the sequence of frames is finished. In this manner a subset of a scene of a black and white video signal may be colored.

Once the operator is satisfied with the color of the frames colored, the operator may select a new starting position and the process may be started again until all of the film is colored.

Another process for assigning colors is as follows. The computer may assign colors based on the grey levels of pixels. That is, for each moving edge of the working frame, the computer may search for pixels adjacent to the moving edge in an adjacent frame (this could be the working frame) hvaing a grey luminance level within a pre-determined range of the grey level of pixels in the moving edge, and assign colors to the pixels of the moving edge according to the color signal of the color mask for the pixels within that range of grey level. Other processes may be used, for example based on grey levels on either side of the moving edge or based on direction of movement. Searches may be made over several frames for pixels having corresponding grey levels, or direction of movement may be analyzed over more than one frame.

The color mask produced and described above by the graphics computer, may be displayed along with the black and white signal on the color corrector monitor 26 to produce a colored video signal. To do this, the color mask is encoded as a color subcarrier on the black and white video signal to produce a standard colored video signal. If desired, the colors of the color mask may be color contoured by modulating the color subcarrier with the black and white video signal. Also if desired, the color corrector 24, for example a Cox Color Corrector may be used by an operator to improve the visual characteristics of the colored video signal.

MODULATION

Referring to FIG. 1 the output of the coloring computer 16 and the black and white video signal (which may be noise reduced as shown below) are combined in the modulator/encoder 22. It is desirable to have the chroma level of the color signal vary as a function of the luminance of the black and white video signal. In particular, the chroma level at high white and at high black may be reduced to enhance the visual quality of the color video signal.

ENCODING

The color signal input to the modulator/encoder 22 is a color subcarrier operating at the transistor-transistor-logic (TTL) level which is encoded in a standard NTSC (National Television Standards Committee) encoder onto the luminance signal of the black and white video signal. The resulting color signal is input to the color corrector 24.

COLOR CORRECTING

The color corrector 22 may be a Cox Color Corrector. This color corrector may be used to modify the eight variables defining the luminance of the black and white video signal. These are peak black, grey, white, peak white, black level, white level, gamma level and chroma. The color corrector 22 modifies only the luminance of the black and white video signal but may display both color and black and white signal in its monitor 26.

The color corrector 24 is controlled by a microcomputer 28, for example an IBM-PC available from International Business Machines. An operator uses the microcomputer 28 to alter the luminance values for a certain frame which may be viewed on the monitor 26. The microcomputer 28 is also used to store the modification values on disk. The microcomputer 28 and color corrector 24 are connected through a digital to analog convertor of known construction so that their input-/output are compatible.

The microcomputer 28 is programmed in any one of several known languages to perform the following operations.

The microcomputer 28 receives eight channels of information representing the eight luminance variables from the color corrector 24 through the digital to analog converter interface between the color corrector 24 and microcomputer 28. The keyboard of the microcomputer 28 is used to modify the eight luminance values, and the modification inforamtion is stored on a disk. Twelve values representing the eight luminance variables plus four color variables are stored for each frame. As a whole scene is processed through the color corrector 24, under control of the coloring computer 16 using a VITC counter (not shown) the modifification values are stored on a disk by the microcomputer 28 and identified by a time code derived from the VITC. Later, when the black and white video signal is played back during edit, the modification values may be placed back from the disk to the color corrector 28.

EDITING

For editing, an operator sits with access to the keyboards of the coloring computer 16, the microcomputer 28 and microcomputer 30 (for example a CMX computer available from CMX Inc.)

For the combining of the color mask with the black and white video signal together with the modification values for the luminance values stored by the microcomputer 28, it is necessary that the outputs be synchronized. This is done using the VITC time codes which are embedded on the color mask and the black and white video signal.

An identical time code is placed on the master video tape on which the color signal is to be recorded. The operator then tells the coloring computer 16 the time code for the scene to be recorded, sets the microcomputer 28 so that the appropriate modification values are ready to be output and presets both the black and white video player 8 for playback at the correct time code and the video recorder 34 at the correct time code. The black and white video signal may or may not be noise reduced. The coloring computer 16 is set 6 frames before the part to be recorded since the video player 8 and video recorder 34 have a pre-determined pre-roll. The microcomputer 30 then sets all running at the same time, and ensures that when the coloring computer 16 begins output, all of the time codes are synchronized.

The coloring computer 16 output consisting of the color mask for the scene being recorded is combined in the encoder 22 with the output from the black and white video player 8. Color correction is performed by the color corrector 24 using the stored values. The color corrected color video signal is then recorded by the video recorder 34 to produce a color video signal.

As noted above, the black and white video signal may also be noise reduced as follows.

NOISE REDUCTION USING MOTION INDICATOR KEY

The motion indicator key may also be used to remove noise from the video signal without smearing moving edges. We now describe a method and apparatus for carrying out such noise reduction.

For the embodiment described here, it is desirable that the motion indicator key be composed of a series of pulses, for example of +5 volts each, each pulse extending over those pixels of a frame that correspond to moving edges in the video signal. Such a key preferably has zero level for those pixels corresponding to portions of a signal which represent objects that are stationary from one frame to the next or which represent the interior of a moving object. The motion indicator key produced as described above produces a satisfactory input.

The motion indicator key is used generally as follows. Firstly the motion indicator key is ramped on both sides of each pulse indicating areas of motion. A frame of the video signal is then selected as a subject frame. At least two adjacent frames to the subject frame are then averaged along with the subject frame. Both the subject frame and the averaged frame are then input to apparatus described more particularly below. The output from the apparatus is determined by the motion indicator key. Where the motion indicator key indicates motion, the signal from the subject frame is selected as output. Where the key indicates no motion the signal from the averaged frame is selected as output. Parts of the frame adjacent areas of motion will be subject to the ramp of the motion indicator key, and this ramp is used to blend the subject frame and the average frame progressively between the areas of motion and other areas. The ramping ensures that the boundaries between the noise reduced and normal video signal are softened (this is called soft edge keying). The resulting composite output is therefore noise reduced in most of the frame, excepting those areas corresponding to most motion, and moving edges are not blurred.

Referring to FIG. 4, the output from the C—A generator shown at 220 has each pulse of the motion indicator key lengthened by an amount determined in the manner described below.

The pulses of the motion indicator key are lengthened in the circuit comprised of integrated circuits 122, 222, 224 and 226, and resistor 228, variable resistor 230 and capacitor 232. The output at 220 is input at 234 and the lengthened pulse is output at 236. Integrated circuits 122 and 222 may be, for example, model number MM74HC32 available from Motorola Semiconductor Products, and integrated circuits 224 and 226 may be model number 74LS121 available from Texas Instruments Inc. and model number MM74HC04 available from Motorola Semiconductor Products, respectively.

Figure 7:
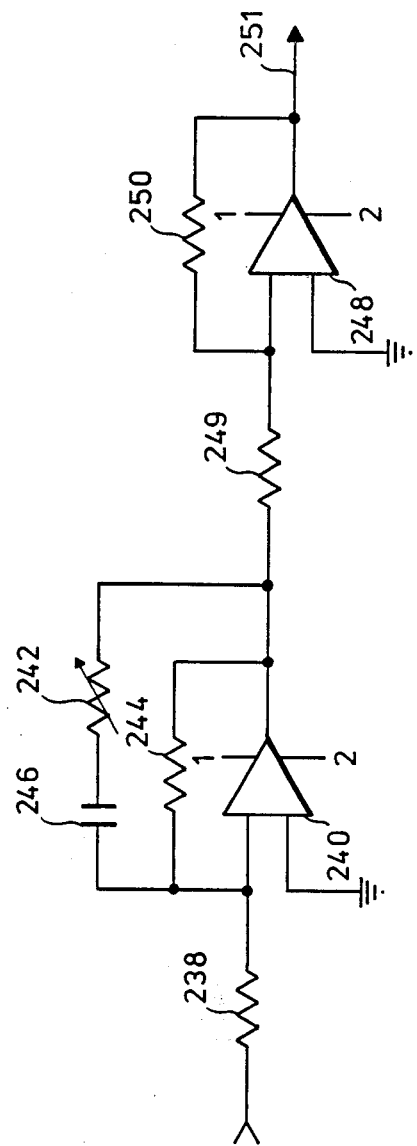
FIG. 7 is a schematic of a pulse shaper for the motion indicator key as lengthened by the apparatus schematically shown in FIG. 4.

The motion indicator key with lengthened pulses is fed through a pulse shaper as shown in FIG. 7 to slow the rise and fall time of the pulses. This is accomplished by feeding the square wave pulse of the motion indicator key through resistor 238 to the input of integrated circuit 240, for example model number LM318N available from National Semiconductor Corp. which is configured as an integrator which slows the transition between levels. The ramp speed is controlled by the potentiometer 242 in the feedback loop of the integrated circuit 240, together with resistor 244 and capacitor 246 together with resistors 249 and 250. Integrated circuit 248 may also be model number LM318N.

The output at 251 from the pulse shaper is then fed as input at 252 in the soft edged keyer shown in FIG. 8.

The average of three consecutive frames of the black and white video signal is at input at 254 through resistor 258 and with grounded resistor 260. Clearly, other averages may be taken, however, we find this average to be preferable. The middle frame of the three consecutive frames is input at 256 through resistor 262 as a subject frame, with grounded resistor 264.

Variable gain amplifiers 266 and 268 (each for example integrated circuit CA3080A available from RCA Solid State Division together wth resistors 270, 272 and 274 and capacitor 276) are controlled by the inverse control set by integrated circuits 278 and 280 (both for example model number LM318N available from National Semiconductor Corp.). The output of the variable gain amplifiers 266 and 268 is summed in integrated circuit 282 for example model number LM318N as described above, configured as an amplifier, after passing through resistors 284 and 286 respectively.

The gains of integrated circuits 278 and 280 are set inverse to each other so that the amplifiers 266 and 268 are inverse to each other. The key input at 252 therefore increases the gain of amplifier 268 when motion is present, and decreases it when motion is not present. The reverse happens for amplifier 266. In this manner the input signals of the averaged frame and the motion frame are mixed in the output at 285.

Integrated circuits 278 and 280 are controlled by potentiometers 286 and 288 respectively in their feedback loops together with resistors 294, 296, 298 and 300 and variable resistors 302 and 304 connected in the manner shown. Voltage connections 1, 2, 3 and 4 to the integrated circuits are +12, −12, +5 and −5 volts respectively.

The ramping of the motion indicator key thus ensures that the output at 285 shows soft edges where there are transitions between motion and non-motion. The use of the soft edging improves the visual characteristics of the noise reduced video signal and avoids any harsh and visible dividing lines.

The ramp speed may be adjusted to improve the quality of the motion picture at the moving edges. The lengthening of the pulse is required so that ramping does not extend over the part of the key that indicates motion. If the motion portion of the key is ramped picture quality may be impaired. The degree of lengthening is dependent on the method used to ramp the motion pulses and speed of the ramping. This noise reduced video signal may then be combined with the color mask produced by the coloring computer 16 in the manner described above to produce a colored video signal.

GENERAL

Various modifications of the method and apparatus described here may be made without departing from the spirit of the invention. For example, in the C—A generator the inverted frame may be any one of several nearby frames. The number of frames between the compared frames is only constrained by the loss of accuracy if the number of intervening frames increases. That is, differences between frames far from each other may be due to movement of more than one moving edge or intervening edges or other changes in the frames. Hence it is desirable to operate with nearby frames, such as a two frame delay as here.

In addition, in the claims, 'frame' may refer to any subset of the video signal. For example, the video signal may be processed line by line, or several frames at a time.

In addition, in the assigning of color signals to pixels in a frame of the black and white video signal, processes for assigning colored signals may be used other than the one described here. For example, portions of adjacent frames may be colored with colors that are defined by assigned luminance levels for those colors. Also, searches for corresponding colors may be made over several frames and assignment of colors made on that basis.

Also, in noise reduction, while we have found it preferable to use three consecutive frames to produce the averaged frame for input to the soft edge keyer, it is possible to use other combinations of frames.

We claim:

1. A method of producing a color video signal from a black and white video signal, the black and white video signal being composed of a plurality of consecutive frames and each frame comprising a plurality of pixels, the method comprising:
   (a) determining pixels of the black and white video signal for each frame in areas of motion in the frame to produce a motion indicator key for each frame;
   (b) assigning color signals to one reference frame of the black and white video signal to produce a color mask;
   (c) selecting a color assigning process;
   (d) selecting a working frame adjacent to the reference frame having a color mask;
   (e) assigning the color signals of the color mask of the reference frame to corresponding pixels of the working frame to produce a color mask for the working frame;
   (f) applying the color assigning process to replace color signals of pixels in the areas of motion in the working frame as determined by the motion indicator key;
   (g) repeating steps (c) to (f) to produce a color mask for each frame of the black and white video signal; and combining the color mask with the black and white video signal to produce a color video signal.

2. The method of claim 1 in which the color assigning process further comprises:
   analyzing the motion indicator keys of the working frame and the reference frame and comparing the pixel locations in the areas of motion in the reference frame to pixel locations in the areas of motion in the working frame to determine the direction of the motion; and removing color signals from pixels of the color mask of the working frame corresponding to motion and assigning color signals to these pixels by moving color signals in the direction of motion.

3. The method of claim 1 in which the color assigning process comprises:
   for pixels of the working frame corresponding to motion, searching for pixels of the black and white video signal adjacent to the pixels corresponding to motion for pixels having a grey level within a predetermined range of the grey level of pixels corresponding to motion to produce a set of adjacent pixels; and assigning the color signals of the adjacent pixels to the pixels corresponding to motion.

4. The method of claim 2 in which determining the motion indicator key comprises:
   selecting a motion threshold to distinguish noise from motion;
   inverting a frame of the video signal;
   adding a nearby frame to the frame inverted to produce a composite signal;
   comparing the magnitude of the composite signal to the motion threshold to produce a motion signal indicating pixels of the composite signal in which the magnitude is greater than the motion threshold; and
   repeating these steps for each frame of the video signal to produce a motion indicator key for the video signal.

5. The method of claim 3 in which determining the motion indicator key comprises:
   selecting a motion threshold to distinguish noise from motion;
   inverting a frame of the video signal;
   adding a nearby frame to the frame inverted to produce a composite signal;
   comparing the magnitude of the composite signal to the motion threshold to produce a motion signal indicating pixels of the composite signal in which the magnitude is greater than the motion threshold; and
   repeating these steps for each frame of the video signal to produce a motion indicator key for the video signal.

6. The method of claim 4 further including reducing noise in the black and white video signal by:
   selecting a subject frame of the video signal;
   averaging at least two frames which are nearby to the subject frame to produce an averaged frame;
   constructing a composite frame by selecting luminance values from the subject frame where the motion indicator key indicates motion and selecting luminance values from the averaged frame where the motion indicator key does not indicate motion; and
   repeating these steps for each frame of the video signal to produce a noise reduced video signal.

7. The method of claim 5 further including reducing noise in the video signal by:
   selecting a subject frame of the video signal; averaging at least two frames which are nearby to the subject frame to produce an averaged frame;
   constructing a composite frame by selecting luminance values from the subject frame where the motion indicator key indicates motion and selecting luminance values from the averaged frame where the motion indicator key does not indicate motion; and
   repeating these steps for each frame of the video signal to produce a noise reduced video signal.

8. The method of claim 6 in which the magnitude of the composite signal is compared to the motion threshold by comparing the composite signal with the motion threshold to produce a first signal indicating areas of the composite signal for which the signal strength is greater than the motion threshold, comparing the composite signal with the negative of the motion threshold to produce a second signal indicating areas of the composite signal for which the signal strength is less than the negative of the motion threshold, and combining the first and second signals to produce said motion signal.

9. The method of claim 7 in which the magnitude of the composite signal is compared to the motion threshold by comparing the composite signal with the motion threshold to produce a first signal indicating areas of the composite signal for which the signal strength is greater than the motion threshold, comparing the composite signal with the negative of the motion threshold to produce a second signal indicating areas of the composite signal for which the signal strength is less than the negative of the motion threshold, and combining the first and second signals to produce said motion signal.

10. The method of claim 8 further including ramping the motion indicator key and soft edge mixing of the averaged frame and the subject frame.

11. The method of claim 9 further including ramping the motion indicator key and soft edge mixing of the averaged frame and the subject frame.

12. The method of claim 10 in which the frame inverted is two frames delayed from the frame added to the inverted frame.

13. The method of claim 11 in which the frame inverted is two frames delayed from the frame added to the inverted frame.

14. The method of claim 12 in which the frames averaged include the first frame preceding and the first frame succeeding the averaged frame.

15. The method of claim 13 in which the frames averaged include the first frame preceding and the first frame succeeding the averaged frame.

16. The method of claim 14 in which the reference frame is two frames delayed from the reference frame.

17. The method of claim 15 in which the reference frame is two frames delayed from the reference frame.

18. The method of claim 5 in which the method of determining the motion indicator key is carried out in an apparatus comprising:
    means for selecting a motion threshold;
    inverter means for inverting a frame of the video signal;
    adder means for adding a nearby frame to the frame inverted to produce a composite signal; and
    comparer means for comparing the magnitude of the composite signal to the motion threshold to produce a motion signal indicating pixels of the composite signal in which the magnitude is greater than the motion threshold.

19. The method of claim 18 in which said method is performed in an analog circuit.

20. The method of claim 6 in which the method of determining the motion indicator key is carried out in an apparatus comprising:
    means for selecting a motion threshold;
    inverter means for inverting a frame of the video signal;
    adder means for adding a nearby frame to the frame inverted to produce a composite signal; and
    comparer means for comparing the magnitude of the composite signal to the motion threshold to produce a motion signal indicating pixels of the composite signal in which the magnitude is greater than the motion threshold.

21. The method of claim 20 in which said method is performed in an analog circuit.

* * * * *

UNITED STATES PATENT OFFICE
CERTIFICATE OF CORRECTION

Patent No. 4,755,870　　　　　　　　　Dated July 5, 1988

Inventor(s) Wilson Markle and Brian Hunt

It is certified that error appears in the above-identified patent and that said Letters Patent are hereby corrected as shown below:

At column 2, line 31, delete "(c)" and replace it by --(d)--.
At column 6, line 50, delete "when" and replace it by --and--.
At column 10, line 11, after the word "for", insert --the--.
At column 12, line 29, replace "placed", by --played--.
At column 15, line 28, replace "one reference", by --a--.
At column 15, line 32, in the first line of step (d), delete "the" and replace it by --a--.
At column 15, line 42, in the first line of step (g) of claim 1 replace "(c)" by --(d)--.
At column 17, line 30, in the first line of claim 16, replace "reference", by --working--.
At column 18, line 1, replace "reference", by --working--.

Signed and Sealed this

Seventeenth Day of January, 1989

Attest:

DONALD J. QUIGG

*Attesting Officer*　　　　　*Commissioner of Patents and Trademarks*